(12) United States Patent
Honda et al.

(10) Patent No.: US 8,430,190 B2
(45) Date of Patent: Apr. 30, 2013

(54) DRIVING APPARATUS FOR HYBRID VEHICLE

(75) Inventors: Kenji Honda, Saitama (JP); Toshiyuki Yumoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 233 days.

(21) Appl. No.: 12/937,940

(22) PCT Filed: Feb. 19, 2009

(86) PCT No.: PCT/JP2009/052894
§ 371 (c)(1),
(2), (4) Date: Oct. 14, 2010

(87) PCT Pub. No.: WO2009/128288
PCT Pub. Date: Oct. 22, 2009

(65) Prior Publication Data
US 2011/0036652 A1 Feb. 17, 2011

(30) Foreign Application Priority Data
Apr. 14, 2008 (JP) ................................ P.2008-104670

(51) Int. Cl.
*B60K 6/48* (2007.10)
(52) U.S. Cl.
USPC ...................... 180/65.25; 180/65.21; 180/65.6
(58) Field of Classification Search .............. 180/65.25, 180/65.235, 65.265, 65.7, 65.6, 65.21; 475/5, 475/8, 211
See application file for complete search history.

(56) References Cited

U.S. PATENT DOCUMENTS 3,699,351 A * 10/1972 Addie ............................... 475/5
5,474,428 A 12/1995 Kimura et al.
5,662,547 A * 9/1997 Moroto et al. ................... 477/48
(Continued)

FOREIGN PATENT DOCUMENTS

CN 1521033 A 8/2004
CN 1836948 A 9/2006
(Continued)

OTHER PUBLICATIONS

JP Office Action issued to JP Patent Application No. 2010-508128 Jan. 17, 2012.
(Continued)

*Primary Examiner* — Hau Phan
(74) *Attorney, Agent, or Firm* — Arent Fox LLP (57) ABSTRACT

A driving apparatus for a hybrid vehicle includes an engine shaft, a generator shaft and an idler shaft, which are arranged in parallel. The generator shaft includes at least an inner shaft and a hollow outer shaft which is attached rotatably relative to the inner shaft. The engine shaft connected to the crank shaft of an engine is engaged, through a generator driving gear, to the inner shaft which is coaxially provided with a generator. The outer shaft of the generator shaft which is coaxially provided with a motor is engaged to the idler shaft through a motor driving force transmission gear. The engine shaft and idler shaft are engaged to each other through an engine driving force transmission gear. The idler shaft and a differential device are engaged each other through a final gear. The differential device is connected to driving wheels, through a differential axles. The engine shaft has a clutch which serves to engage or disengage the power between the engine shaft and idler shaft through the engine driving force transmission gear.

10 Claims, 5 Drawing Sheets

U.S. PATENT DOCUMENTS

| | | | |
|---|---|---|---|
| 5,690,576 A * | 11/1997 | Moroto et al. | 475/211 |
| 5,856,709 A * | 1/1999 | Ibaraki et al. | 475/5 |
| 6,855,084 B2 * | 2/2005 | Sato et al. | 475/209 |
| 6,997,831 B2 * | 2/2006 | Kanda et al. | 474/8 |
| 7,086,977 B2 * | 8/2006 | Supina et al. | 475/5 |
| 7,128,677 B2 * | 10/2006 | Supina et al. | 475/5 |
| 7,278,939 B2 * | 10/2007 | Sato et al. | 474/72 |
| 7,678,003 B2 * | 3/2010 | Janson et al. | 475/5 |
| 7,845,444 B2 * | 12/2010 | Kidokoro et al. | 180/65.235 |
| 2002/0036106 A1 | 3/2002 | Hanyu et al. | |
| 2002/0084118 A1 | 7/2002 | Esaki | |
| 2008/0076616 A1 | 3/2008 | Kidokoro et al. | |

FOREIGN PATENT DOCUMENTS

| | | |
|---|---|---|
| EP | 0 445 873 A1 | 9/1991 |
| EP | 1 705 049 A2 | 9/2006 |
| JP | 6-174055 A | 6/1994 |
| JP | 8-91065 A | 4/1996 |
| JP | 8-159221 A | 6/1996 |
| JP | 9-132042 A | 5/1997 |
| JP | 2001-138752 A | 5/2001 |
| JP | 2002-199506 A | 7/2002 |
| JP | 2002-325308 A | 11/2002 |
| JP | 2003-063260 A | 3/2003 |
| JP | 2003-63260 A | 3/2003 |
| JP | 2006-264532 A | 10/2006 |
| JP | 2007-022112 A | 2/2007 |
| JP | 2008-074267 A | 4/2008 |
| WO | WO 96/38313 A1 | 12/1996 |

OTHER PUBLICATIONS

Chinese Office Action dated Jan. 24, 2013.

* cited by examiner

DRIVING APPARATUS FOR HYBRID VEHICLE

CROSS-REFERENCE TO RELATED APPLICATION

This application is a National Stage entry of International Application No. PCT/JP2009/052894, filed Feb. 19, 2009, which claims priority to Japanese Patent Application No. 2008-104670 filed Apr. 14, 2008, the disclosure of the prior application is incorporated in its entirety by reference.

TECHNICAL FIELD

This invention relates to a driving apparatus for a hybrid vehicle, and more particularly to a driving apparatus for a hybrid vehicle including an engine, a motor and a generator.

BACKGROUND ART

As a driving apparatus for a hybrid vehicle including an engine, a motor and a generator, for example, there is an apparatus disclosed in Patent Reference 1. In this driving apparatus for a hybrid vehicle, considering vehicle loading capability, the engine and generator are arranged coaxially while the generator and motor are arranged in parallel so that the entire length of a power transmission system is shortened.
Patent Reference 1: JP-A-8-91065

SUMMARY OF THE INVENTION

Problems that the Invention is to Solve

However, if the engine and generator are arranged coaxially as described in Patent Reference 1, the outer diameter of the generator cannot be increased due to the limitation of engine merging plane. So, in order to obtain necessary torque and power, it was necessary to enlarge an axial dimension. This led to an increase in the axial length, thus deteriorating the loading capability. Further, since the generator and motor are arranged in parallel, the outer shape became bulky in a side view in the figure (axial view), thereby deteriorating loading capability.

This invention has been accomplished in view of the above problem, and an object thereof is to provide a driving apparatus for a hybrid vehicle capable of providing a large generator outer diameter without suffering from the limitation of the engine merging plane, thereby shortening the axial length.

Means to Solve the Problem

In order to attain the above object, according to an aspect of the invention, there is provided a driving apparatus for a hybrid vehicle (e.g. a driving apparatus for a hybrid vehicle 100 according to an embodiment described later) includes:
an engine (e.g. an engine 50 in the embodiment);
a first shaft (e.g. an engine shaft 1 in the embodiment) which is arranged coaxially with an output shaft (e.g. a crank shaft 51 in the embodiment) of the engine, and transmits power from the engine;
a second shaft (e.g. a generator shaft 2 in the embodiment) arranged in parallel to the first shaft and including:
an inner shaft (e.g. an inner shaft 2a in the embodiment) connected to the first shaft through a first transmission mechanism (e.g. a generator driving gear 10 in the embodiment) and
a first outer shaft (e.g. a motor-use outer shaft 2b in the embodiment) arranged rotatably relative to the inner shaft around the inner shaft;
a first motor (e.g. a generator 60 in the embodiment) connected to the inner shaft;
a second motor (e.g. a motor 70 in the embodiment) arranged coaxially with the first motor and connected to the first outer shaft;
a third shaft (e.g. an idler shaft 3 in the embodiment) arranged in parallel to the second shaft and connected to the first outer shaft through a second transmission mechanism (e.g. a motor driving force transmission gear 20 in the embodiment);
a differential device (e.g. a differential device 45 in the embodiment) connected to the third shaft; and
a clutch unit (e.g. a clutch 80 in the embodiment) which is arranged on the first shaft, and engages or disengages the first shaft and the third shaft through a third transmission mechanism (e.g. an engine driving force transmission gear 30 in the embodiment).

According to another aspect of the invention, it is adaptable that
the first motor is connected to the inner shaft through a second outer shaft (e.g. a generator-use outer shaft 2c in the embodiment) provided around the inner shaft and rotatable together with the inner shaft; and
the first motor and the second motor are supported on the second outer shaft and the first outer shaft, respectively by bearings (e.g. bearings 61, 62; 71, 72 in the embodiment) provided at both ends, respectively.

According to still another aspect of the invention, it is adaptable that
the third transmission mechanism includes a transmitting section (e.g. an output gear 31a in the embodiment) connected to the clutch unit and a transmitted section (e.g. an input gear 31b in the embodiment) connected to the differential device; and
the clutch unit is provided on the inner side of the transmitting section.

According to still another aspect of the invention, it is adaptable that
a transmission mechanism row including the first to third transmission mechanisms and the clutch unit is housed in a region of a width Ld of the differential device in the axial direction.

According to still another aspect of the invention, it is adaptable that
the first motor and the second motor are arranged adjacently to the transmission mechanism row; and
the outer diameter of the first motor and second motor is smaller than a maximum outer diameter Dt of the transmission mechanism row around the second shaft.

According to still another aspect of the invention, it is adaptable that the driving apparatus for the hybrid vehicle, further including:
a first case (e.g. a first case 52a in the embodiment) for housing the transmission mechanism row and one end of the second motor;
a second case (e.g. a second case 52b in the embodiment) fixed adjacently to the first case, for the one end of the first motor and the other end of the second motor;
a third case (e.g. a third case 52c in the embodiment) fixed adjacently to the second case for housing the other end of the first motor, wherein
a stator (e.g. a stator 75 in the embodiment) of the second motor is fixed in the first case, and a stator (e.g. a stator 65 in the embodiment) of the first motor is fixed in the second case.

According to still another aspect of the invention, it is adaptable that the second case is provided with at least two bearings (e.g. bearings 61, 72 in the embodiment) for supporting the first outer shaft and the second outer shaft.

According to still another aspect of the invention, it is adaptable that the driving apparatus for the hybrid vehicle, further including:

a fourth shaft (e.g. an oil pump shaft 4 in the embodiment) arranged in parallel to the first shaft and connected therewith through a fourth transmission mechanism (e.g. an oil pump driving gear 90 in the embodiment), wherein an oil pump (e.g. an oil pump 95 in the embodiment) is connected to the fourth shaft.

According to still another aspect of the invention, there is provided a driving apparatus for a hybrid vehicle (e.g. a driving apparatus for a hybrid vehicle 200 according to the embodiment) including:

an engine (e.g. an engine 50 in the embodiment);

a first shaft (e.g. an engine shaft 1 in the embodiment) which is arranged coaxially with an output shaft (e.g. a crank shaft 51 in the embodiment) of the engine, and which transmits power from the engine;

a second shaft (e.g. a generator shaft 2 in the embodiment) arranged in parallel to the first shaft and including:

an inner shaft (e.g. an inner shaft 2a in the embodiment) connected to the first shaft through a first transmission mechanism (e.g. a generator driving gear 10 in the embodiment) and an outer shaft (e.g. an motor-use outer shaft 2b in the embodiment) arranged around the inner shaft;

a first motor (e.g. a generator 60 in the embodiment) connected to the inner shaft;

a second motor (e.g. a motor 70 in the embodiment) arranged on the same axial line as the first motor and connected to the outer shaft;

a third shaft (e.g. an idler shaft 3 in the embodiment) arranged in parallel to the second shaft and connected to the outer shaft through a second transmission mechanism (e.g. a motor driving force transmission gear 20 in the embodiment); and a differential device (e.g. a differential device 45 in the embodiment) connected to the third shaft.

According to still another aspect of the invention, it is adaptable that the transmitting section of the third transmission mechanism is supported in the first case through a four-point contact ball bearing (e.g. a bearing 88 in the embodiment).

Effects of the Invention

In accordance with the aspect of the driving apparatus for the hybrid vehicle of the invention, the driving by the engine and the driving by the motor can be used selectively or simultaneously. Further, since the first motor is arranged in parallel to the output shaft of the engine, there is no limitation to the merging plane with the engine so that the outer diameter of the first motor can be increased. Thus, it is not necessary to increase the axial length in order to provide the torque or output of the first motor. By shortening the axial length, the loading capability can be improved. Further, by engaging the engine with the first motor through the first transmission mechanism, the speed ratio between the engine and the first motor can be set optionally. Thus, it is possible to match efficient ranges of the first motor and the engine at the time of using the first motor and the engine together as the generator, thereby improving the power generating efficiency. Further, the first motor and second motor are arranged coaxially to each other, thus, the size from side view can be reduced. This leads to an improvement of the loading capability.

Further, in accordance with the driving apparatus for the hybrid vehicle of the invention, the first motor and second motor can be individually supported. By individually supporting them, it is possible to prevent their vibrations from influencing each other.

Further, in accordance with the driving apparatus for the hybrid vehicle of the invention, the clutch unit is provided on the inner side of the transmitting section of the third transmission mechanism so that the space in the inner side of the third transmission mechanism can be efficiently used, thereby decreasing the length in the axial direction.

Further, in accordance with the driving apparatus for the hybrid vehicle of the invention, the gears constituting the transmission mechanism row and the clutch unit are fallen within the width Ld of the differential device which is a final output shaft. Thus, the axial length of the device can be shortened.

Further, in accordance with the driving apparatus for the hybrid vehicle of the invention, the outer diameter of the first motor and second motor is smaller than the maximum outer diameter Dt of the transmission mechanism row around the second shaft so that the radial length of the entire apparatus can be reduced.

In accordance with the driving apparatus for the hybrid vehicle of the invention, the stator is fixed in each case so that the first motor and second motor can be surely held and protected and the assembling capability can be also improved. Further, since the second case is commonly used as a case for the first motor and second motor, the number of components can be reduced.

Further, in accordance with the driving apparatus for the hybrid vehicle of invention, at least two bearings which is the bearing supporting the first outer shaft and the bearing supporting the second outer shaft are provided in the second case sandwiched between the first case and third case. Thus, the bearings can be rigidly fixed.

Further, in accordance with the driving apparatus for the hybrid vehicle of the invention, the oil pump shaft is arranged separately from the engine shaft so that the axial length of the entire apparatus can be restricted.

Further, in accordance with the driving apparatus for the hybrid vehicle of the invention, since the first motor is arranged in parallel to the output shaft of the engine, there is no limitation to the merging plane with the engine so that the outer diameter of the first motor can be increased. Thus, it is not necessary to increase the axial length in order to provide the torque or output of the first motor. By shortening the axial length, the loading capability can be improved. Further, by engaging the engine with the first motor through the first transmission mechanism, the speed ratio between the engine and the first motor can be set optionally. Thus, it is possible to match respective efficient ranges of the first motor and the engine at the time of using the first motor and the engine together as the generator, thereby improving the power generating efficiency. Further, the first motor and second motor are arranged coaxially. Thus, the size from side view can be reduced. This leads to an improvement of the loading capability.

Further, in accordance with the driving apparatus for the hybrid vehicle of the invention, it is not necessary to support the transmitting section of the third transmission mechanism at two ends by two deep-groove ball bearings. It is possible to support it at one end by using a single bearing of a four-point contact ball bearing so that the number of components can be reduced, thereby shortening the axial length of the driving apparatus for the hybrid vehicle.

DESCRIPTION OF REFERENCE NUMERALS AND SIGNS

1 . . . engine shaft (first shaft), 2 . . . generator shaft (second shaft), 2a . . . inner shaft, 2b . . . motor-use outer shaft (first outer shaft), 2c . . . generator use outer shaft (second outer shaft), 3 . . . idler shaft (third shaft), 4 . . . oil pump shaft (fourth shaft), 10 . . . generator driving gear (first transmission mechanism), 11a . . . output gear, 11b . . . input gear, 12 . . . bearing, 13 . . . bearing, 20 . . . motor driving transmission gear (second transmission mechanism), 21a . . . output gear, 21b . . . input gear, 30 . . . engine driving force transmission gear (third transmission mechanism), 31a . . . transmission gear (transmission section), 31b . . . input gear (transmitted section), 40 . . . final gear, 41a . . . output gear, 41b . . . input gear, 45 . . . differential device (differential gear), 46 . . . differential shaft, 47 . . . driving wheel, 50 . . . engine, 51 . . . crank shaft, 52 . . . driving device case, 52a . . . first case, 52b . . . second case, 52c . . . third case, 53 . . . damper housing, 54 . . . bolt, 55 . . . driving plate, 56 . . . damper, 57 . . . bearing, 58 . . . bearing, 59a . . . bearing, 59b . . . bearing, 60 . . . generator (first motor), 61 . . . bearing, 62 . . . bearing, 63 . . . resolver, 63a . . . resolver rotor, 63b . . . resolver stator, 64 . . . rotor, 65 . . . stator, 70 . . . motor (second motor), 71 . . . bearing, 72 . . . bearing, 73 . . . resolver, 73a . . . resolver rotor, 73b . . . resolver stator, 80 . . . clutch (clutch unit), 81 . . . clutch disk, 82 . . . clutch plate, 83 . . . clutch piston, 84 . . . first clutch holding member, 85 . . . outer hub, 86 . . . second clutch holding member, 87 . . . inner hub, 88 . . . bearing (four-point contact ball bearing), 89 . . . stopper, 90 . . . oil pump driving gear, 91a . . . output gear, 91b . . . input gear, 95 . . . oil pump, 97 . . . operating room, and 100, 200 . . . driving apparatus for a hybrid vehicle.

DESCRIPTION OF THE PREFERRED EMBODIMENTS

Figure 1:
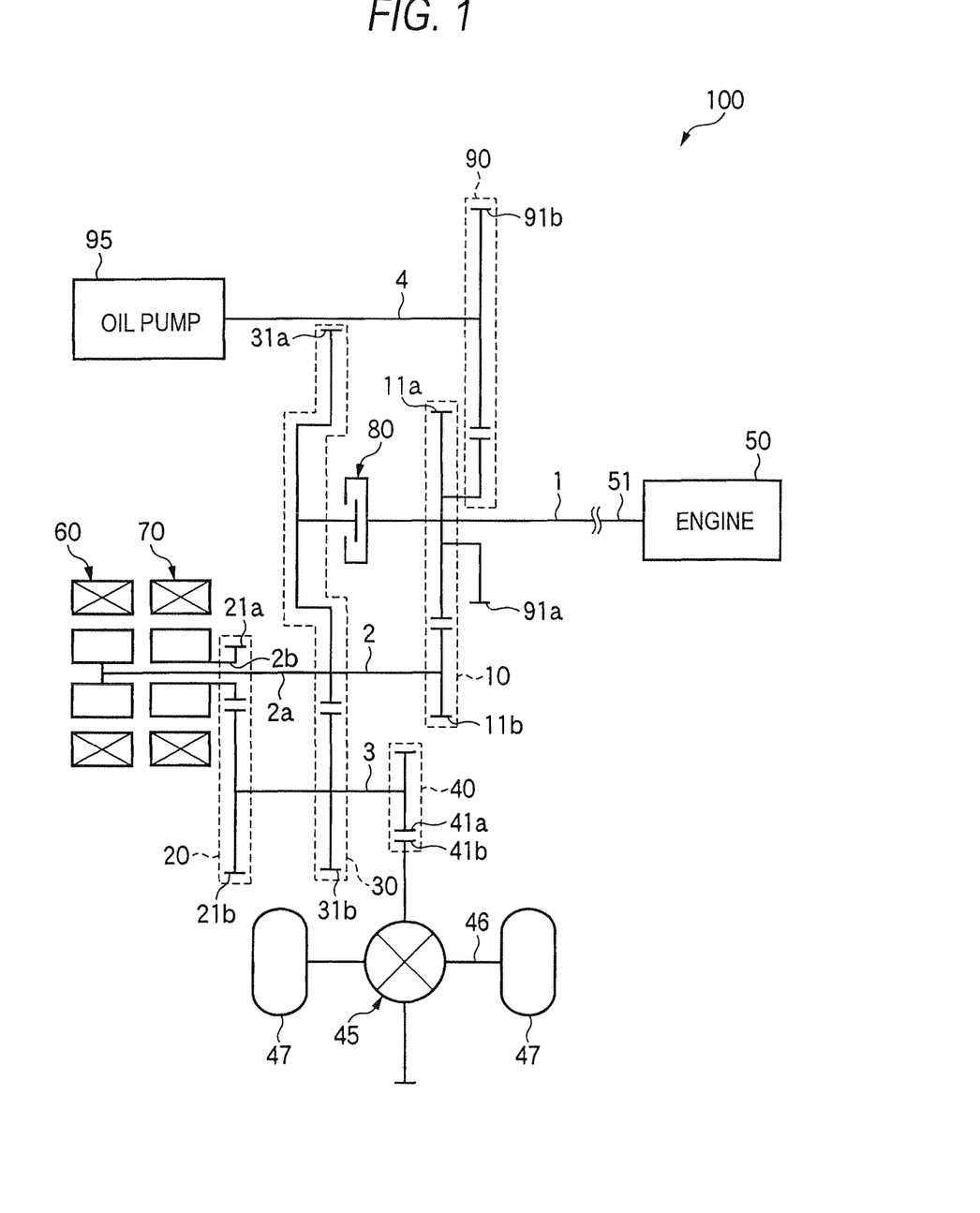
FIG. 1 is a schematic view of a first embodiment of a driving apparatus for a hybrid vehicle of the invention.
Figure 2:
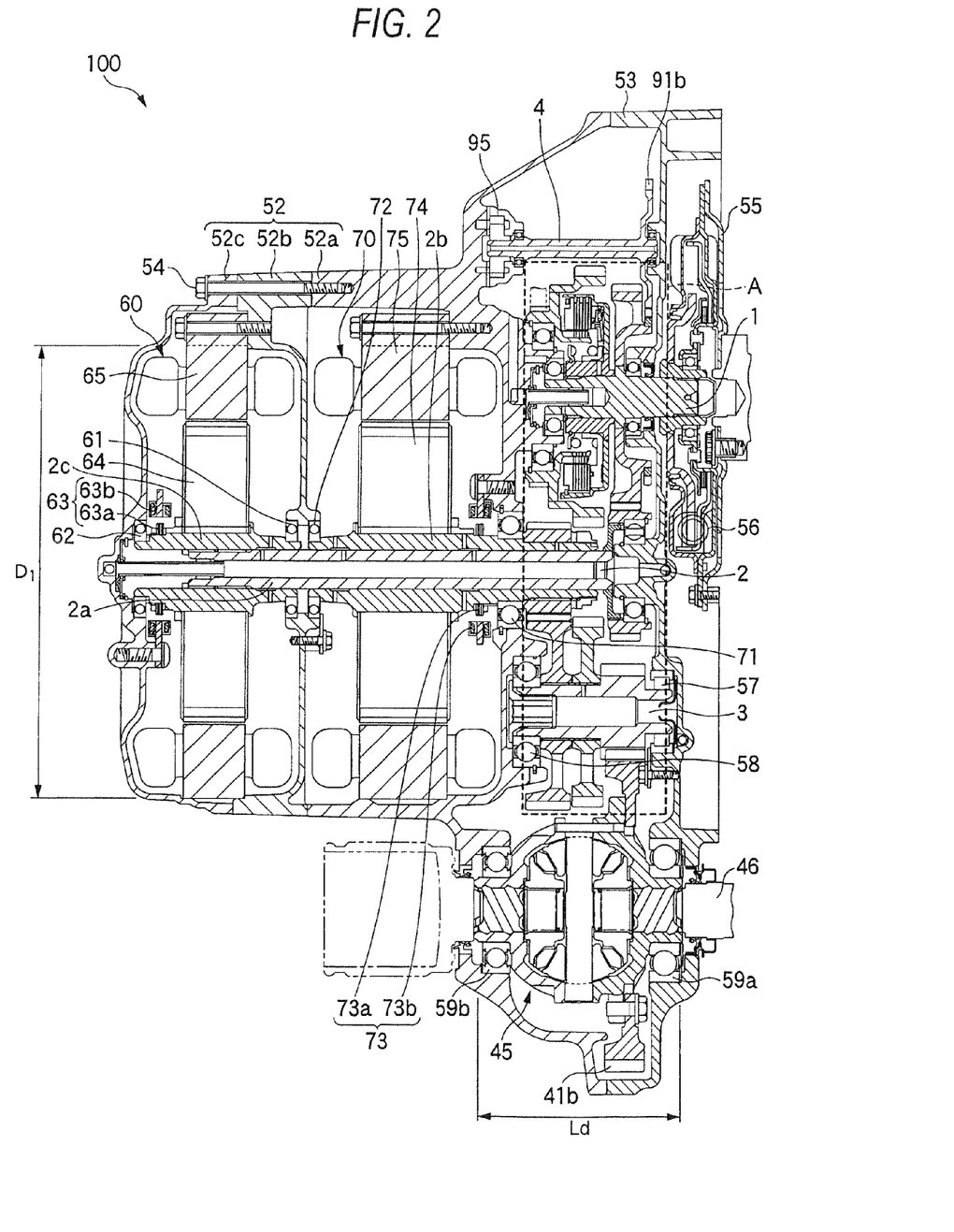
FIG. 2 is a sectional view of a driving apparatus for a hybrid vehicle of the invention; and a view taken in a B-B arrow in FIG. 4.
Figure 3:
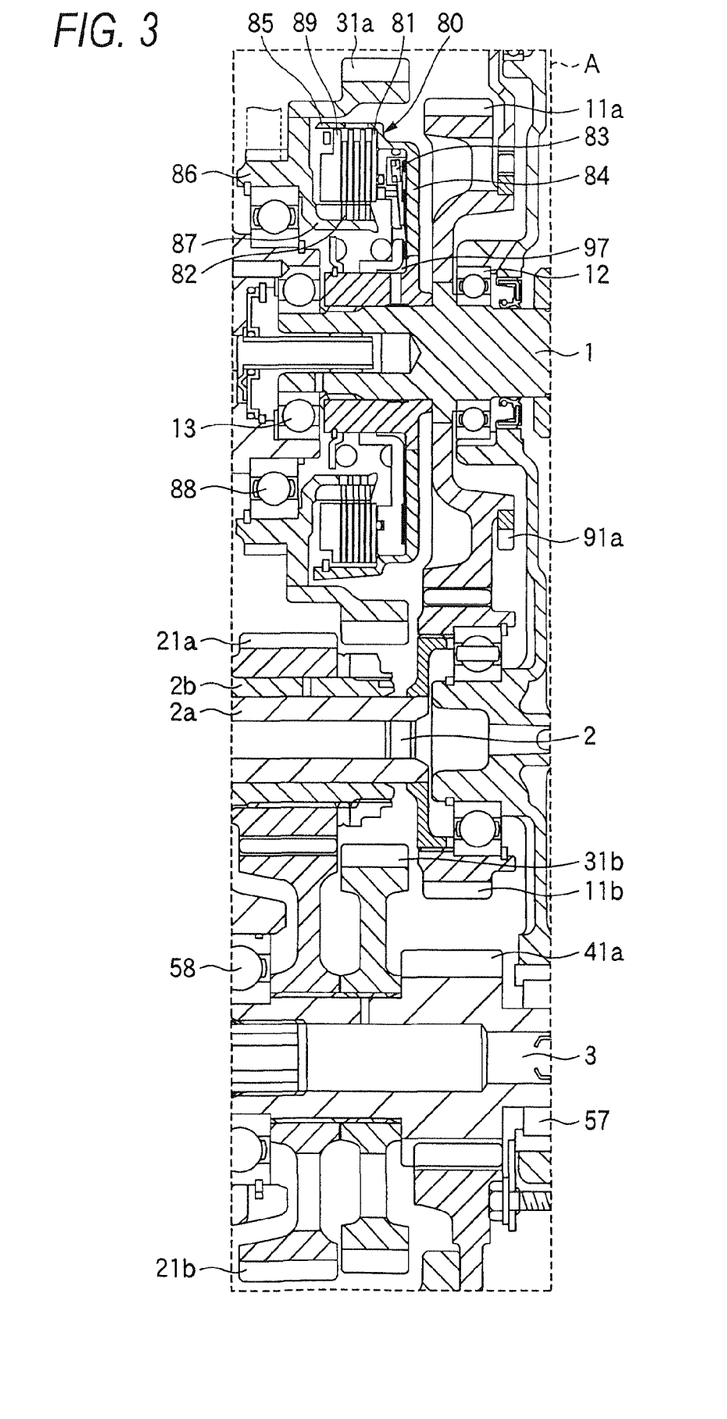
FIG. 3 is an enlarged view of part A in FIG. 2.
Figure 4:
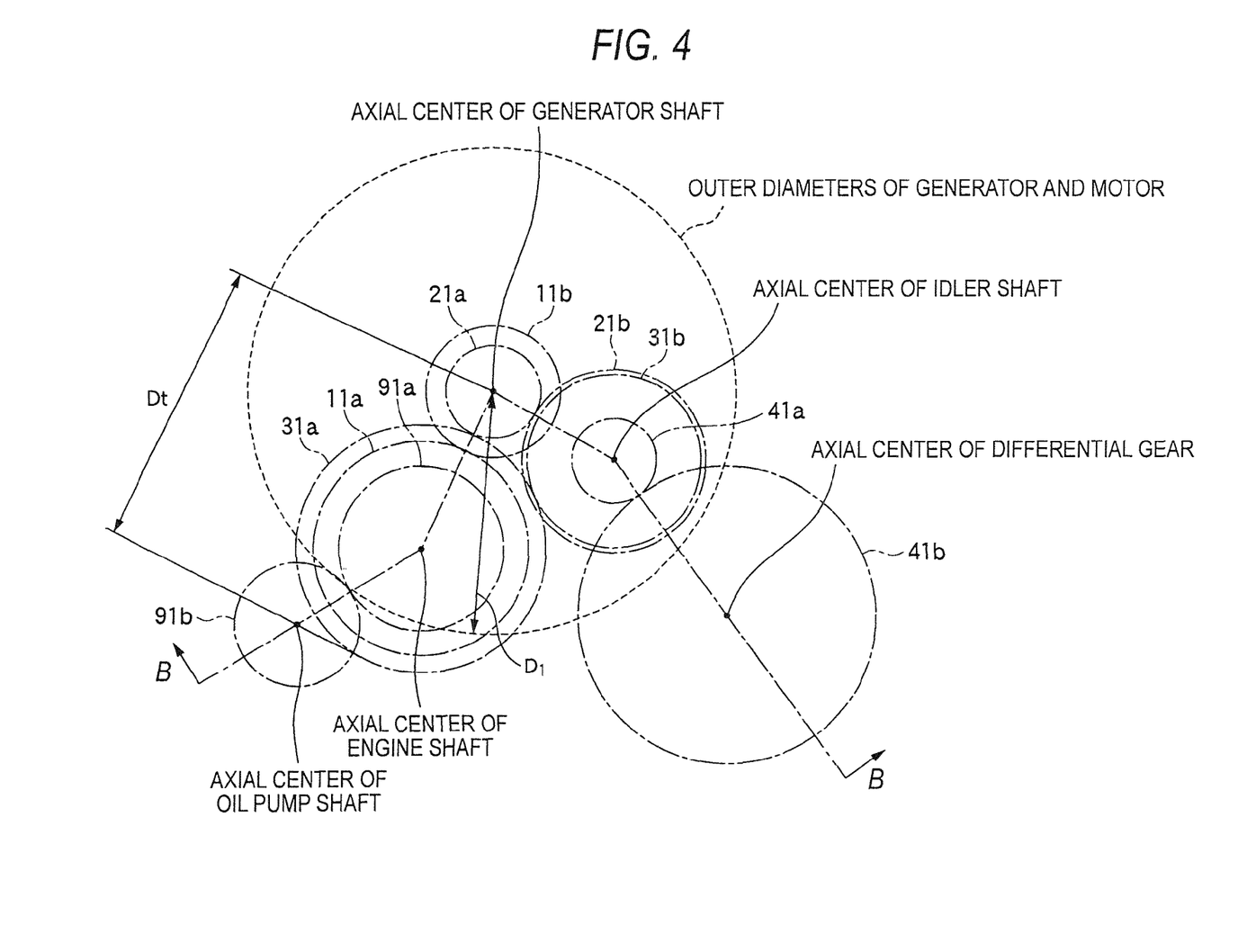
FIG. 4 is a view for explaining the relationship in transmission mechanisms of the driving apparatus for the hybrid vehicle of FIG. 2.

Hereinafter, referring to the drawings, a detailed explanation will be given of a driving apparatus for a hybrid vehicle of the invention. FIG. 1 is a schematic view of a first embodiment of a driving apparatus for a hybrid vehicle of the invention. FIG. 2 is a sectional view of a driving apparatus for a hybrid vehicle of the invention. FIG. 3 is an enlarged view of part A in FIG. 2. FIG. 4 is a view for explaining the relationship in a transmission mechanism of the driving apparatus for the hybrid vehicle of FIG. 2.

As shown in FIG. 1, a driving apparatus for a hybrid vehicle 100 of the invention includes an engine shaft 1 (first shaft), a generator shaft 2 (second shaft) and an idler shaft 3 (third shaft), which are arranged in parallel.

The generator shaft 2 includes at least an inner shaft 2a and a hollow outer shaft 2b (first outer shaft) which is attached rotatably relative to the inner shaft 2a.

The engine shaft 1 connected to a crank shaft 51 of an engine 50 is engaged, through a generator driving gear 10 (first transmission mechanism), to the inner shaft 2a of the generator shaft 2 which is provided with a generator 60 (first motor) on an axial line of the engine shaft 1. The outer shaft 2b of the generator shaft 2 which is provided with a motor 70 (second motor) on its axial line is engaged to the idler shaft 3 through a motor driving force transmission gear 20 (second transmission mechanism). The engine shaft 1 and idler shaft 3 are engaged to each other through an engine driving force transmission gear 30 (third transmission mechanism).

The idler shaft 3 and a differential device 45 (differential gear) are engaged to each other through a final gear 40. The differential device 45 is connected to driving wheels 47, 47 through a differential axles 46.

The engine shaft 1 is provided with a clutch 80 (engage-disengage means) which serves to engage or disengage the power between the engine shaft 1 and idler shaft 3 through the engine driving force transmission gear 30.

The driving apparatus for the hybrid vehicle 100 having these components as main components has a transmission path which transmits the driving force of the motor 70 to the driving wheels 47, 47 to travel the vehicle and another transmission path which transmits the driving force of the engine 50 to the driving wheels 47, 47 to travel the vehicle, and uses selectively or simultaneously these two transmission paths to travel the vehicle.

First, referring to FIG. 1, an explanation will be given of the transmission path which transmits the driving force of the motor 70 to the driving wheels 47, 47 to travel the vehicle.

The engine driving force inputted to the inner shaft 2a of the generator shaft 2 from the engine shaft 1 through the generator driving gear 10 rotates the inner shaft 2a of the generator shaft 2. Thereby, the generator 60 fixed to the inner shaft 2a of the generator 2 rotates together with the generator shaft 2 to generate electric power. By using the electric power generated by the generator 60, the motor 70 connected to the outer shaft 2b which is arranged rotatably relative to the inner shaft 2a of the generator shaft 2 rotates the outer shaft 2b of the generator shaft 2. Then, the motor 70 transmits its driving force to the idler shaft 3 through the motor driving force transmission gear 20. The driving force thus transmitted is transmitted to the driving wheels 47, 47 through the final gear 40, differential device 45 and differential axles 46. Thus, the entire driving force of the engine 50 is changed into electricity by the generator 60, thereby realizing "series running".

On the other hand, in the transmission path which transmits the driving force of the engine 50 to the driving wheels 47, 47 to travel the vehicle, by engaging the clutch 80 attached to the engine shaft 1, the driving force of the engine shaft 1 is transmitted to the idler shaft 3 through the transmission gear 30. The driving force thus transmitted is transmitted to the driving wheels 47, 47 through the final gear 40, differential device 45 and differential axles 46.

In this case, the engine shaft 1 and inner shaft 2a of the generator shaft 2 are always engaged to each other through the generator driving gear 10 so that the generator 60 is caused to generate electric power which rotates the motor 70. This enables "parallel running" using both machinery and electricity. Further, by executing "zero torque control" on the motor 70 and generator 60, dragging loss is minimized so that the vehicle can traveled using only the engine 50.

Referring to FIGS. 2 to 4, a concrete explanation will be given of the structure of a driving apparatus for a hybrid vehicle 100 of the invention.

The driving apparatus for the hybrid vehicle 100 of the invention is housed, from the engine 50 side, in a driving apparatus case 52 having first, second and third cases 52a, 52b and 52c. The first case 52a is fixed to a damper housing 53 for housing a damper 56. The first, second and third cases 52a, 52b and 52c are connected to one another by a plurality of bolts 54. Within the driving apparatus case 52, the engine shaft 1, generator shaft 2 and idler shaft 3 are arranged in parallel to one another.

The engine shaft 1 is arranged coaxially with the crank shaft 51 of the engine 50. The engine 50 side of the engine shaft 1 is supported in the damper housing 53 by a bearing 12, and its opposite side is supported in the first case 52a by a bearing 13. The driving force of the crank shaft 51 is transmitted to the engine shaft 1 through a drive plate 55 and the damper 56. On the engine shaft 1, at its central position in the axial direction, an output gear 11a constituting the generator driving gear 10 is provided; and on the side opposite to the engine 50 with respect to the output gear 11a, the clutch 80 is provided. Adjacently to the output gear 11a, on the engine 50 side of the output gear 11a, an output gear 91a constituting an oil pump driving gear 90 is integrally provided.

The clutch 80 is a "multi-plate clutch" which includes a plurality of disk-shaped clutch disks 81 and clutch plates 82 and a clutch piston 83 for urging these clutch disks 81 and clutch plates 82. The plurality of clutch disks 81 are held at their outer periphery by a cylindrical outer hub 85 provided at the outer edge of a first clutch holding member 84 and are movable in the axial direction. The plurality of clutch plates 82 are held at their inner periphery by a cylindrical inner hub 87 fixed to a second clutch holding member 86 and are movable in the axial direction. Further, the clutch disks 81 and clutch plates 82 are arranged in parallel to each other and alternately superposed apart from one another in the axial direction.

An output gear 31a constituting the engine driving force transmission gear 30 is integrally rotatably attached to the outer edge of the second clutch holding member 86. Further, the second clutch holding member 86 is supported, at its base inner face, in the first case 52a by a bearing 88. Here, the bearing 88 is a four-contact ball bearing and this bearing 88 supports only one end of the second clutch holding member 86 in the first case 52a.

The clutch 80 thus structured severs to permit the clutch disks 81 and clutch plates 82 to contact with or separate from each other by controlling the oil pressure in an operating room 97. Specifically, when the pressure in the operating room 97 decreases to a predetermined value, a clutch piston 83 moves to the engine 50 side. The adjacent clutch disk 81 and clutch plate 82 are separated so that the clutch 80 is disengaged. At this time, the driving force of the engine shaft 1 will not be transmitted to the engine driving force transmission gear 30 through the clutch 80.

On the other hand, when pressure in the operating room 97 is increased so as to be higher than the predetermined value, the clutch piston 83 moves opposite side of to the engine 50. Thus, the clutch piston 83 urges the clutch disks 81 and clutch plates 82 to move toward the side opposite to the engine 50, thereby sandwiching these clutch disks 81 and clutch plates 82 between itself and a stopper 89 fixed to the outer hub 85. Thus, the adjacent clutch disk 81 and clutch plate 82 are friction-engaged to engage the clutch 80 so that the second clutch holding member 86 is directly engaged to the engine shaft 1 so as to be locked up. At this time, since the output gear 31a constituting the generator driving gear 10 is attached to the second clutch holding member 86, the driving force of the engine shaft 1 is transmitted to the idler shaft 3 through the engine driving force transmission gear 30 by the clutch 80. It should be noted that the driving force of the engine shaft 1 is also transmitted to the generator shaft 2 through the generator driving gear 10.

The generator shaft 2 is arranged in parallel to the engine shaft 1 and includes an inner shaft 2a, and a motor-use outer shaft 2b (first outer shaft) and a generator-use outer shaft 2c (second outer shaft), which are arranged around the inner shaft 2a. Specifically, on the inner shaft 2a, an input gear 11b to be tooth-engaged with the output gear 11a of the generator driving gear 10 of the engine shaft 1 is provided at its engine side end. Further, on the inner shaft 2a, the motor-use outer shaft 2b is attached rotatably relative to the inner shaft 2a at its nearly central position of the inner shaft 2a. Furthermore, on the inner shaft 2a, the generator-use outer shaft 2c, which is spline-connected to the end opposite to the engine 50 of the inner shaft 2a and rotates together with the inner shaft 2a, is attached adjacently to the motor-use outer shaft 2b.

The generator-use outer shaft 2c is attached with the generator 60 which is integrally rotatable, and supported in the second case 52b by a bearing 61 at the end of the engine 50 side and in the third case 52c by a bearing 62 at the end of the side opposite to the engine 50. Further, between the bearing 62 and generator 60, a resolver rotor 63a of a resolver 63 for detecting the rotating angle of the generator-use outer shaft 2c is attached to the generator-use outer shaft 2c and a resolver stator 63b is attached at the opposite position.

The generator 60 includes a rotor 64 with its inner side end fixed to the generator-use outer shaft 2c and a stator 65 fixed in the second case 52c and arranged oppositely to the rotor 64. Because of such a structure, the driving force of the engine shaft 1 is transmitted to the inner shaft 2a of the generator shaft 2 through the generator driving gear 10 so that the rotor 64 of the generator 60 is rotated through the generator-use outer shaft 2c from the inner shaft 2a. Thus, the driving force of the engine shaft 1 can be transformed into electric power.

Onto the motor-use outer shaft 2b, the motor 70 which is integrally rotatable is attached and the output gear 21a constituting the motor driving force transmission gear 20 is attached at its engine 50 side end. Further, the motor-use outer shaft 2b is arranged between the motor 70 and the output gear 21a, and supported in the first case 52a by a bearing 71 and in the second case 52b by a bearing 72 at the end on the side opposite to the engine 50. Further, between the bearing 71 and motor 70, a resolver rotor 73a of a resolver 73 for detecting the rotating angle of the motor-use outer shaft 2b is attached to the motor-use outer shaft 2b and a resolver stator 73b is attached at the opposite position.

The motor 70 includes a rotor 74 with its inner side end fixed to the motor-use outer shaft 2b and a stator 75 fixed in the first case 52a and arranged oppositely to the rotor 74.

The idler shaft 3 is arranged in parallel to the generator shaft 2, and includes, sequentially from the engine 50 side, an output gear 41a constituting the final gear 40, an input gear 31b tooth-engaged with the output gear 31a of the engine shaft 1 and constituting the engine driving force transmission gear 30 and an input gear 21b tooth-engaged with the output gear 21a of the motor-use outer shaft 2b attached rotatably relative to the generator shaft 2 and constituting the motor driving force transmission gear 20. The idler shaft 3 is supported in the damper housing 53 by a bearing 57 at its engine 50 side end, and supported in the first case 52a by a bearing 58 at the end on the side opposite to the engine 50.

Because of the structure described above, the motor 70 rotates by the electric power supplied from the generator 60 so that the motor-use outer shaft 2b rotates. Further, the output gear 21a of the motor-use outer shaft 2b is tooth-engaged with the input gear 21b of the idler shaft 3 so that the driving force of the motor 70 is transmitted to the idler shaft 3.

Further, the output gear 31a of the engine shaft 1 constituting the engine driving force transmission gear 30 is tooth-engaged with the input gear 31b of the idler shaft 3 so that during the clutch 80 being engaged, the driving force of the engine shaft 1 is transmitted to the idler shaft 3.

The differential device 45 has a differential axles 46 arranged in parallel to the idler shaft 3, and is supported in the damper housing 53 by a bearing 59a at the end of the engine 50 side and supported in the first case 52a by a bearing 59b at the end of the side opposite to the engine 50. The differential device 45 has an input gear 41b constituting the final gear 40 which is tooth-engaged with the output gear 41a of the idler shaft 3 so that the driving force of the motor 70 inputted to the idler shaft 3 and/or the driving force of the engine 50 are transmitted to the differential axles 46 and further transmitted to the driving wheels 47, 47 via the differential axles 46.

In the driving apparatus for the hybrid vehicle 100 constructed as described above, a transmission mechanism row consisting of the generator driving force transmission gear 10, motor driving force transmission gear 20 and engine driving force transmission gear 30, as seen from FIG. 2, are housed within a region with an axial length (width) Ld of the differential device 45. Further, the outer diameter D1 of the generator 60 and motor 70 coaxially arranged on the generator shaft 2, as seen from FIG. 4, is smaller than the maximum outer diameter Dt of the transmission mechanism row around the generator shaft 2.

Further, an output gear 91a constituting an oil pump driving gear 90 (fourth transmission mechanism) fixed to the engine shaft 1 is tooth-engaged with an input gear 91b of an oil pump shaft 4 (fourth shaft) arranged in parallel to the engine shaft 1 thereby to transmit the driving force of the engine shaft 1 to an oil pump 95. The oil pump 95 pressure-supplies the oil for generating the operating oil pressure of the clutch 80 and for lubricating and cooling the respective components.

The third case 52c externally covering the generator 60 attached to the second case 52b is attached with the resolver stator 63b at the position opposite to the resolver 63a attached to the generator-use outer shaft 2c. The resolver 63 is arranged to be wrapped on the inner side of the coil end opposite to the engine 50 of the stator 65 of the generator 60.

As understood from the description hitherto made, in accordance with the driving apparatus for the hybrid vehicle 100 of the invention, by engaging or disengaging the clutch 80, selectively or simultaneously using the transmission path from the engine 50 and the transmission path from the motor 70, the driving can be done. Further, since the generator 60 is arranged in parallel to the crank shaft 51 of the engine 50, there is no limitation to the merging plane with the engine 50 so that the outer diameter of the generator 60 can be increased according to the specification required. Further, it is not necessary to increase the axial length in order to provide the torque or output of the generator 60. Thus, the axial length of the entire driving apparatus for a hybrid vehicle 100 can be shortened, thereby giving excellent loading capability. Further, by connecting the engine 50 with the generator 60 through the generator driving gear 10, the speed ratio between the engine 50 and the generator 60 can be set optionally so that the engine is matched with an efficient region of the generator 60, thereby improving the power generating efficiency. Further, since the generator 60 and motor 70 are arranged on the same axial line, the generator 60 which is relatively large in the radial length and the motor 70 can be superposed in the axial direction. Thus, the dimension viewed from side in the figure (axial direction) is shortened. This leads to an improvement of the loading capability.

Further, in accordance with the driving apparatus for the hybrid vehicle 100 of the invention, with the generator shaft 2 being made hollow, the motor-use outer shaft 2b and generator-use outer shaft 2c are provided on the outside of the inner shaft 2a, and they are supported by the bearings 71, 72; 61, 62 at their ends, respectively. For this reason, the motor 70 and generator 60 can be supported individually, thereby preventing their vibrations from influencing each other.

Further, in accordance with the driving apparatus for the hybrid vehicle 100 of the invention, the engine driving force transmission gear 30 is engaged to the clutch 80 on the one side and engaged to the differential device 45 on the other side, and the clutch 80 is arranged on the inner side of the output gear 31a. For this reason, the space between the engine shaft 1 and output gear 31a can be efficiently used, thereby decreasing the length in the axial direction.

Further, in accordance with the driving apparatus for the hybrid vehicle 100 of the invention, the transmission mechanism row consisting of the generator driving force transmission gear 10, motor driving force transmission gear 20 and engine driving force transmission gear 30 is housed within the region of the width (axial length) Ld of the differential device 45 so that it is fallen within the width of the differential device 45 having a final output shaft of the transmission mechanism row, thereby shortening the axial length of the transmission mechanism row. Thus, the axial length of the entire driving apparatus for a hybrid vehicle 100 can be decreased and the transmission loss can be also reduced.

Further, in accordance with the driving apparatus for the hybrid vehicle 100 of the invention, the outer diameter D1 of the generator 60 and motor 70 coaxially arranged on the generator shaft 2 is smaller than the maximum outer diameter Dt of the transmission mechanism row around the generator shaft 2 so that the entire driving apparatus for a hybrid vehicle 100 can be downsized.

In accordance with the driving apparatus for the hybrid vehicle 100 of the invention, the stator 75 of the motor 70 is fixed in the first case 52a and the stator 65 of the generator 60 is fixed in the second case 52b. In this way, by fixing each of the stators 75, 65 in each of the cases 52a, 52b, the generator 60 and motor 70 can be surely held and protected and the assembling capability can be also improved. Further, since the second case 52b is commonly used as a case for the generator 60 and motor 70, the number of components can be reduced.

In accordance with the driving apparatus for the hybrid vehicle 100 of the invention, arranged in the second case 52b are at least two bearings 72, 61 of the bearing 72 supporting the motor-use outer shaft 2b at the side opposite to the engine 50 and the bearing 61 supporting the generator-use outer shaft 2c at the engine 50 side. For this reason, these bearings 72, 61 can be rigidly fixed in the second case 52b firmly sandwiched between the first and third cases 52a and 52c.

In accordance with the driving apparatus for the hybrid vehicle 100 of the invention, the oil pump shaft 4 is arranged separately from the engine shaft 1, the axial length can be restricted.

In accordance with the driving apparatus for the hybrid vehicle 100 of the invention, only one end of the second clutch holding member 86 provided with the output gear 31a of the engine driving force transmission gear 30 is supported in the first case 52a through the bearing 88 of a four-point contact ball bearing. Thus, as compared with the case where both ends of the second clutch holding member 86 are supported by two deep-groove ball bearings, the number of components can be reduced and the axial length of the driving apparatus for the hybrid vehicle 100 can be shortened.

Additionally, the driving apparatus for the hybrid vehicle 100 described above which is a first embodiment of this invention has a transmission path which transmits the driving force of the motor 70 to the driving wheels 47, 47 to travel the vehicle and another transmission path which transmits the driving force of the engine 50 to the driving wheels 47, 47 to travel the vehicle, and uses selectively or simultaneously these two transmission paths to travel the vehicle. However, the driving apparatus for the hybrid vehicle of the invention should not be limited to the above described embodiment, but may be appropriately modified or improved. For example, this invention can be also applied to the driving apparatus for the hybrid vehicle permitting only "series running".

Figure 5:
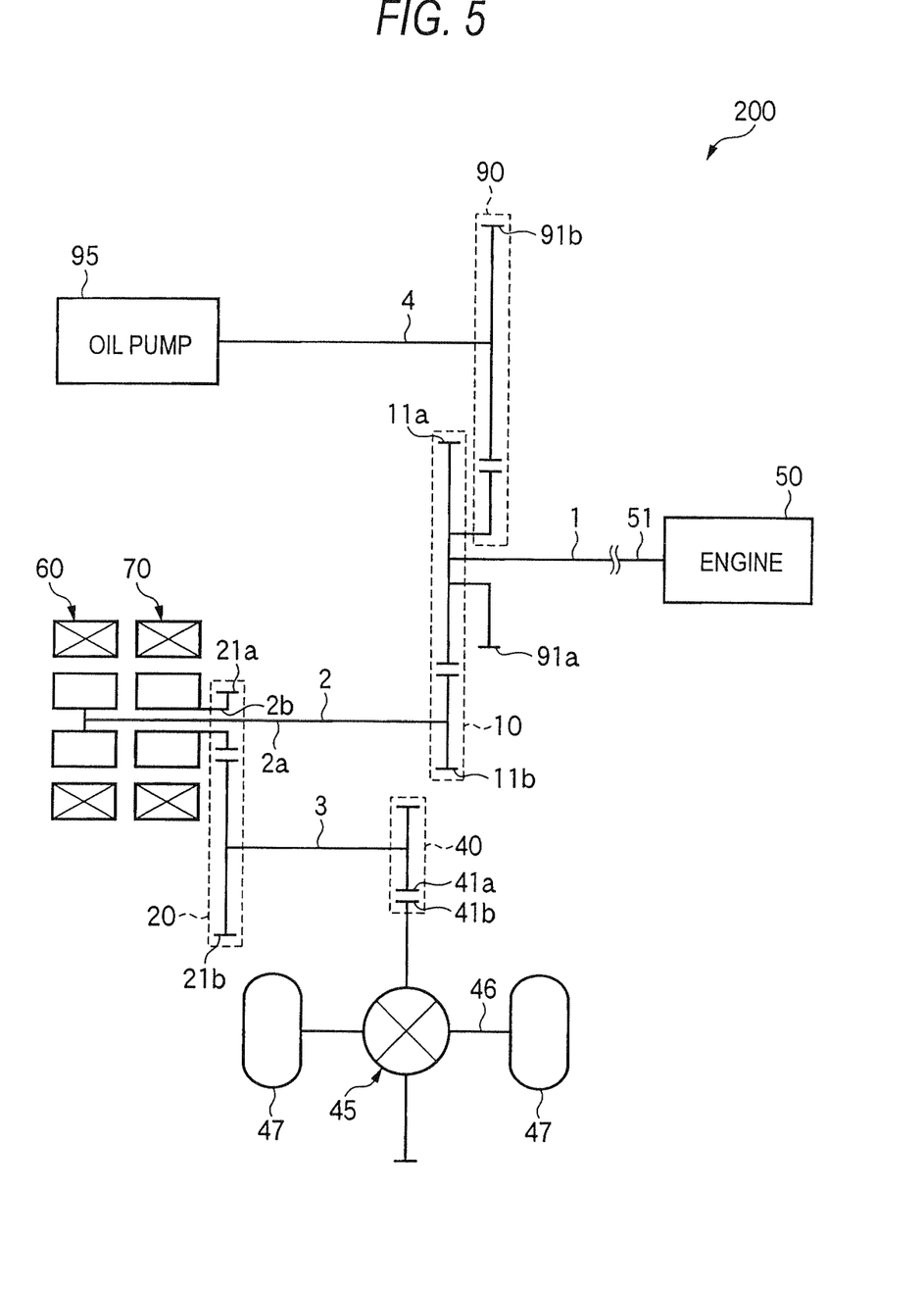
FIG. 5 is a schematic view of a second embodiment of a driving apparatus for a hybrid vehicle of the invention.

A driving apparatus for a hybrid vehicle 200 of a second embodiment of the invention, as seen from FIG. 5, has the same structure as the driving apparatus for the hybrid vehicle 100 according to the above described embodiment except for the clutch 80 and engine driving force transmission gear 30, thereby permitting only "series running". In FIG. 5, like reference symbols refer to like constituent elements in the first embodiment.

This application is based on Japanese Patent Application (Patent Application No. 2008-104670) filed on Apr. 14, 2008, and the contents thereof are incorporated herein by reference.

The invention claimed is:

1. A driving apparatus for a hybrid vehicle comprising:
an engine;
a first shaft which is arranged coaxially with an output shaft of the engine and transmits power from the engine;
a second shaft which is arranged in parallel to the first shaft and comprises:
an inner shaft connected to the first shaft through a first transmission mechanism and a first outer shaft arranged rotatably relative to the inner shaft around the inner shaft;
a first motor connected to the inner shaft;
a second motor arranged coaxially with the first motor and connected to the first outer shaft;
a third shaft arranged in parallel to the second shaft and connected to the first outer shaft through a second transmission mechanism;
a differential device connected to the third shaft; and
a clutch unit which is arranged on the first shaft, and engage or disengage the first shaft and the third shaft through a third transmission mechanism.

2. The driving apparatus for the hybrid vehicle according to claim 1, wherein
the first motor is connected to the inner shaft through a second outer shaft provided around the inner shaft and rotatable together with the inner shaft; and
the first motor and the second motor are axially supported on the second outer shaft and the first outer shaft, respectively by bearings provided at both ends thereof, respectively.

3. The driving apparatus for the hybrid vehicle according to claim 2, wherein
the third transmission mechanism includes a transmitting section connected to the clutch unit and a transmitted section connected to the differential device; and
the clutch unit is provided on the inner side of the transmitting section.

4. The driving apparatus for the hybrid vehicle according to claim 1, wherein
a transmission mechanism row consisting of the first to third transmission mechanisms and the clutch unit is housed in a region of a width of the differential device in the axial direction.

5. The driving apparatus for the hybrid vehicle according to claim 4, wherein
the first motor and the second motor are arranged adjacently to the transmission mechanism row; and
outer diameters of the first motor and second motor are smaller than a maximum outer diameter of the transmission mechanism row around the second shaft.

6. The driving apparatus for the hybrid vehicle according to claim 4, further comprising
a first case housing the transmission mechanism row and one end of the second motor;
a second case fixed adjacently to the first case, and housing one end of the first motor and another end of the second motor;
a third case fixed adjacently to the second case, and housing another end of the first motor, wherein
a stator of the second motor is fixed in the first case, and
a stator of the first motor is fixed in the second case.

7. The driving apparatus for the hybrid vehicle according to claim 6, wherein
the second case has at least two bearings for supporting the first outer shaft and the second outer shaft.

8. The driving apparatus for the hybrid vehicle according to claim 6, wherein
the transmitting section of the third transmission mechanism is supported in the first case through a four-point contact ball bearing.

9. The driving apparatus for the hybrid vehicle according to claim 1, further comprising:
a fourth shaft arranged in parallel to the first shaft and connected to the first shaft through a fourth transmission mechanism,
wherein an oil pump is connected to the fourth shaft.

10. A driving apparatus for a hybrid vehicle comprising:
an engine;
a first shaft which is arranged coaxially with an output shaft of the engine, and transmits power from the engine;
a second shaft arranged in parallel to the first shaft and comprising:
an inner shaft connected to the first shaft through a first transmission mechanism; and
an outer shaft arranged around the inner shaft;
a first motor connected to the inner shaft;
a second motor arranged coaxially with the first motor and connected to the outer shaft;
a third shaft arranged in parallel to the second shaft and connected to the outer shaft through a second transmission mechanism; and
a differential device connected to the third shaft.

* * * * *